United States Patent
Smedstad

(10) Patent No.: US 7,224,080 B2
(45) Date of Patent: May 29, 2007

(54) SUBSEA POWER SUPPLY

(75) Inventor: Eric Smedstad, League City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 67 days.

(21) Appl. No.: 10/907,112

(22) Filed: Mar. 21, 2005

(65) Prior Publication Data

US 2006/0006656 A1    Jan. 12, 2006

Related U.S. Application Data

(60) Provisional application No. 60/521,840, filed on Jul. 9, 2004.

(51) Int. Cl.
 F03B 13/10 (2006.01)
 F03B 13/00 (2006.01)
 H02P 9/04 (2006.01)
(52) U.S. Cl. .......................................... 290/43; 290/54
(58) Field of Classification Search .............. 290/43, 290/54, 1 R, 2; 166/65.1; 136/205; 205/343
 See application file for complete search history.

(56) References Cited

U.S. PATENT DOCUMENTS

| 3,070,703 | A | * | 12/1962 | Podolny ...................... 290/2 |
| 3,459,953 | A | * | 8/1969 | Brauser et al. .............. 290/2 |
| 4,491,738 | A | * | 1/1985 | Kamp ......................... 290/43 |
| 5,117,908 | A | | 6/1992 | Hofmann |
| 5,149,984 | A | * | 9/1992 | Schultz et al. ............... 290/54 |
| 5,202,194 | A | | 4/1993 | VanBerg, Jr. |
| 5,839,508 | A | * | 11/1998 | Tubel et al. ............... 166/65.1 |
| 5,939,667 | A | | 8/1999 | Oudoire et al. |
| 6,100,600 | A | * | 8/2000 | Pflanz ......................... 290/54 |
| 6,150,601 | A | * | 11/2000 | Schnatzmeyer et al. .... 136/201 |
| 6,380,476 | B1 | | 4/2002 | Heijnen et al. |
| 6,383,262 | B1 | | 5/2002 | Marthinsen et al. |
| 6,864,596 | B2 | * | 3/2005 | Maiwald et al. ............ 290/54 |
| 7,002,261 | B2 | * | 2/2006 | Cousins ....................... 290/54 |
| 2002/0011335 | A1 | | 1/2002 | Zhang et al. |
| 2002/0034668 | A1 | | 3/2002 | Zhang et al. |
| 2002/0121377 | A1 | | 9/2002 | Longbottom |
| 2002/0162654 | A1 | | 11/2002 | Bauer et al. |
| 2002/0195349 | A1 | | 12/2002 | Giancarlo |

FOREIGN PATENT DOCUMENTS

GB    2383978 A    7/2003
WO    1991019139 A1    12/1991

* cited by examiner

*Primary Examiner*—Julio Gonzalez
(74) *Attorney, Agent, or Firm*—Clarence E. Eriksen; Bryan P. Galloway; Tim Curington

(57) ABSTRACT

The present invention discloses a subsea power system for use in capturing "free" or "waste" energy (e.g., thermal, geothermal, pressurized subsurface gases or liquids, wind, wave, solar, or other free, waste, or low cost energy sources) to convert and/or store to power a subsea service or device during times when the free or waste energy supply is not as abundant, is not available, or demands require greater output than is provided at steady state. The subsea power system may include: (1) one or more energy-capturing devices—such as a turbine and/or thermoelectric generator—for harvesting free or waste energy, (2) a fuel cell, electrolyzer, and oxygen and hydrogen storage vessels for harvesting energy from the surrounding seawater, and (3) a power converter for receiving energy from the various sources and converting the energy into a useful form consumable by subsea devices.

12 Claims, 5 Drawing Sheets

SUBSEA POWER SUPPLY

CROSS-REFERENCE TO RELATED APPLICATIONS

This claims the benefit under 35 U.S.C. § 119(e) of U.S. Provisional Patent Application Ser. No. 60/521,840, entitled "SUBSEA POWER SUPPLY," filed on Jul. 9, 2004.

TECHNICAL FIELD

The present invention relates to the field of power generation. More specifically, the invention relates to a system for providing power to facilitate subsea well operations.

BACKGROUND

A subterranean well typically includes various pieces of electrical equipment (e.g., an electrical submersible pump, well telemetry tool, and other electrical powered devices) that are located downhole within the well or beneath the surface of the sea adjacent to the well. For purposes of providing power to operate such electrical equipment, electrical cables may be run from a surface power source to the subsea equipment to establish an umbilical connection. Some conventional subsea power sources employ traditional surface techniques with minimized facilities. An example of this approach is the use of a surface buoy with a diesel generator within. Alternatively, a power source may be placed on or near the seabed proximate the electrical equipment and electrical cables may be run between the power supply and the equipment.

However, it is often not practical to use electrical cables running from the surface or seabed to the subterranean or subsea site of the electrically-powered device, because of the great distance involved, or because the cables can interfere with the passage of other equipment through the wellbore, and are vulnerable to being damaged during well operations. Moreover, conventional power generators or power sources do not provide self-sustaining systems. Thus, as soon as the primary power supply is removed, the output of work or operations is stopped.

Accordingly, there exists a need for a self-sustaining subsea power supply system for use in powering subsea well operations, which generates power from waste or free energy (e.g., wind, solar, thermal, wave, pressurized subsurface gases and liquids, and so forth) without cost to directly provide a fuel and/or electricity.

SUMMARY

In general, according to some embodiments, the present invention provides a subsea power system for use in capturing free or waste energy (e.g., thermal, geothermal, pressurized subsurface gases or liquids, wind, wave, solar, or other free, waste, or low cost energy sources) to produce a fuel capable of being used to power a service or device during times when the free or waste energy supply is not as abundant, is not available, or demands require greater output than is provided at steady state.

Other or alternative embodiments of the present invention will be apparent from the following description, from the drawings, and from the claims.

BRIEF DESCRIPTION OF THE DRAWINGS

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the invention may admit to other equally effective embodiments.

DESCRIPTION OF EMBODIMENTS OF THE PRESENT INVENTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate. Furthermore, as used herein, the term "subsea vehicle" is used to mean a remote operated vehicle or an autonomous underwater vehicle, whether such vehicle is tethered to the surface or power source by an umbilical or is free from restraint, untethered and umbilical-less.

In general, an embodiment of the present invention includes a subsea power system for use in supplying power to an electrical device—such an electrical submersible pump ("ESP"), well telemetry tools, downhole and subsea instrumentation, well intervention tools, valves, and so forth. The subsea power system captures freely-available or waste energy including, but not limited to, thermal, geothermal, piezoelectric, pressurized subsurface gases or liquids, wind, wave, solar, or other renewable, free, waste, or low cost energy sources (hereinafter referred to as "free energy") and stores such free energy to power the electrical device during times when the energy supply is not as abundant, is not available, or demands require greater output than is provided at steady state. For example, energy supply may be low when a well having a thermal electric generator is shutting, because there is no longer a temperature differential present from which to generate power.

Figure 1:
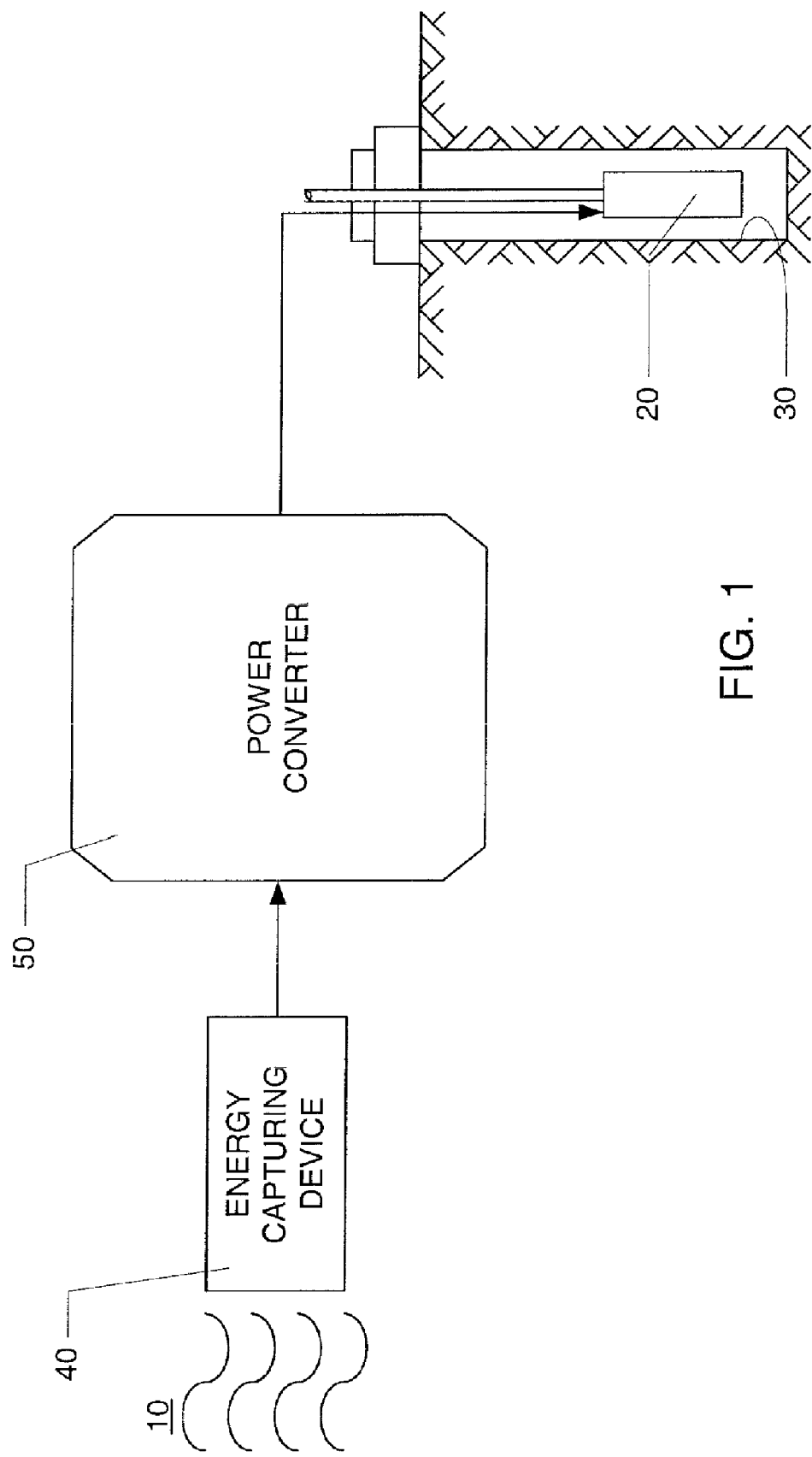
FIG. 1 illustrates a schematic view of an embodiment of a subsea power supply system in accordance with the present invention.

With respect to FIG. 1, one embodiment of the present invention includes a subsea power system for capturing free energy 10 for use in powering an electrical device 20 to be used in a subterranean well 30 or in other subsea applications outside a well or alternatively to be used at the surface. The subsea power system may include an energy-capturing device 40 such as a thermoelectric generator, a turbine, a choke, a heat exchanger, a fuel cell, or any combination thereof. The energy-capturing device 40 is electrically connected to a power converter 50. The power converter 50 receives the free energy 10 from the energy-capturing device 40 and converts it into useable form for powering the electrical device 20.

Figure 2:
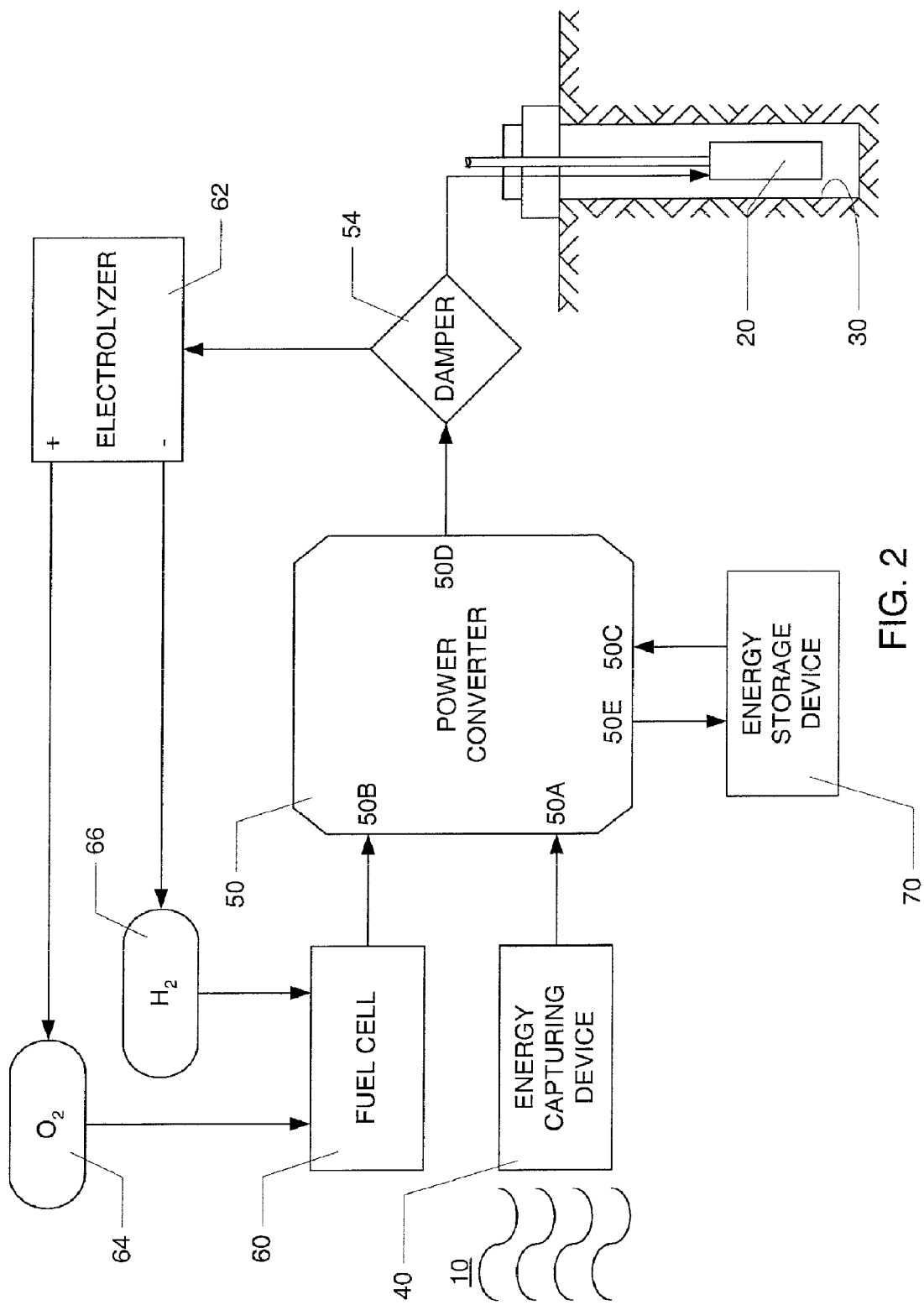
FIG. 2 illustrates a schematic view of an embodiment of a subsea power supply system having a plurality of system components including a power converter, an energy-capturing device, an energy storage device, an electrolyzer, and a fuel cell.
Figure 3:
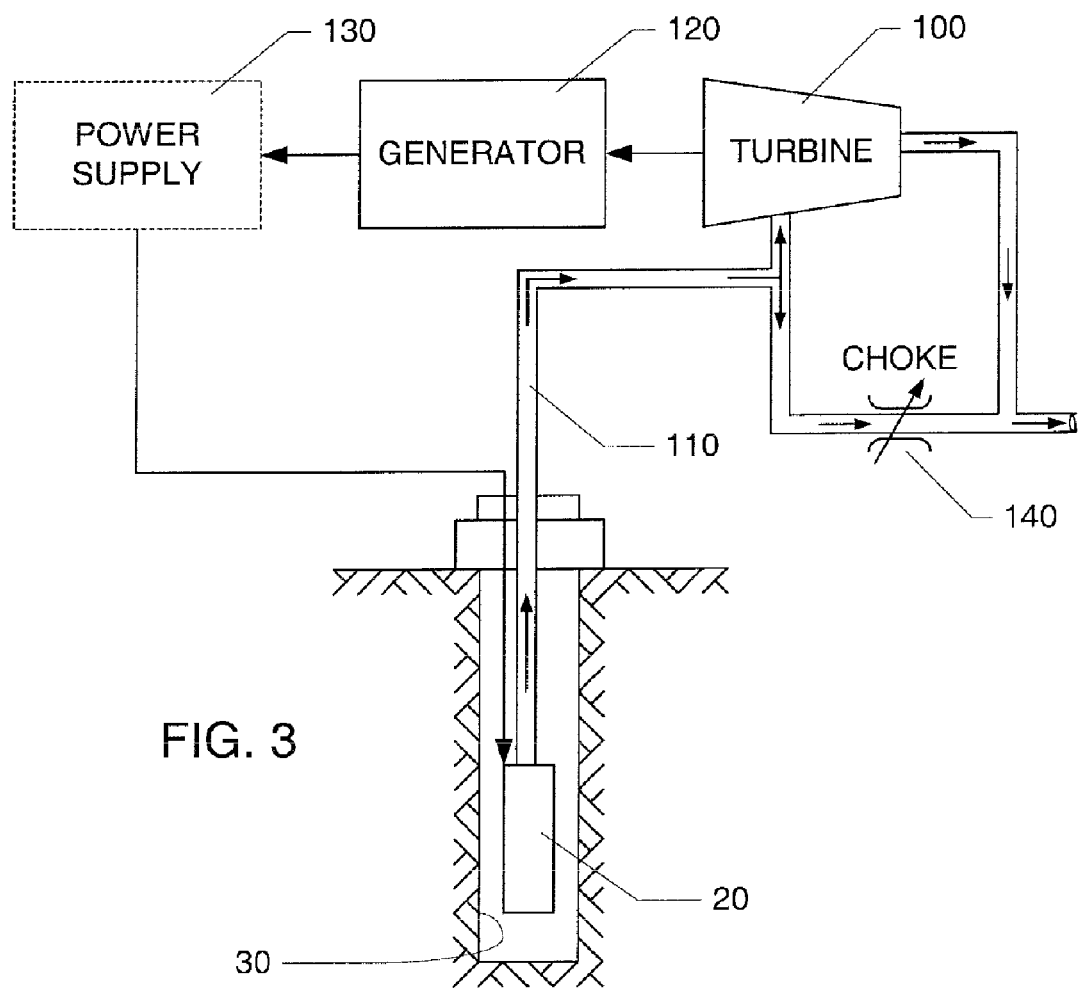
FIG. 3 illustrates a schematic view of an embodiment of a turbine device for use in capturing and supplying energy as a component of a subsea power supply system.

With respect to FIG. 2, another embodiment of the subsea power system includes a power converter 50 having one or more electrical inputs 50A–50C and one or more electrical outputs 50D–50E. The input 50A may be electrically connected to one or more energy-capturing devices 40 for supplying free energy 10 to the subsea power system. As described above, any number of devices for capturing free energy may be employed and electrically connected to the power converter 50. For example, as shown in FIG. 3, the energy-capturing device 40 may be a flowline turbine 100 hydraulically connected to a flowline 110 or other conduit connected to the well 30. The production fluid in the flowline 110 rotates the turbine 100 to create mechanical energy. The turbine 100 is mechanically connected to a generator 120 for converting the mechanical energy into electrical energy. The electrical energy is then supplied to a power supply 130. The power supply 130 may be the power converter 50 (FIG. 2) of the subsea power system, and the generator 120 may be electrically connected to the power converter 50 via input 50B. In some embodiments the turbine may be installed inline with the flowline (not shown). In other embodiments, flow of production fluid through the flowline 110 may be regulated by a choke 140 installed in parallel with the turbine 100 (FIG. 3). To supply more flow to the turbine 100 and thus generate more power, the choke 140 is closed tighter to restrict the flow of production fluid therethrough and thus direct more flow to the turbine. To supply less flow to the turbine 100 and thus reduce the amount of power generated, the choke 140 is opened wider to permit unhindered flow of production fluid therethrough and thus direct less flow to the turbine. It is significant that the flow is not choked or hindered by the turbine to such a degree that production flow is insufficient to reach the surface, storage, or other intended destination from the well. The turbine flowline is actively controlled to manage the speed of the turbine and may include a choke on the turbine line in addition to the choke on the parallel line.

Figure 4:
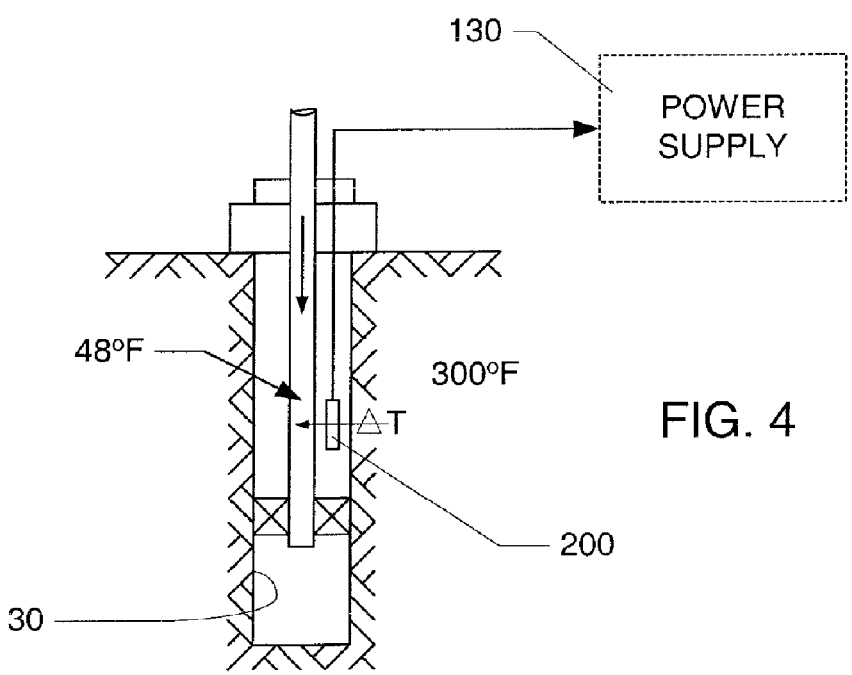
FIG. 4 illustrates a schematic view of an embodiment of a thermoelectric generator device for use in capturing and supplying energy as a component of a subsea power supply system.
Figure 5A:
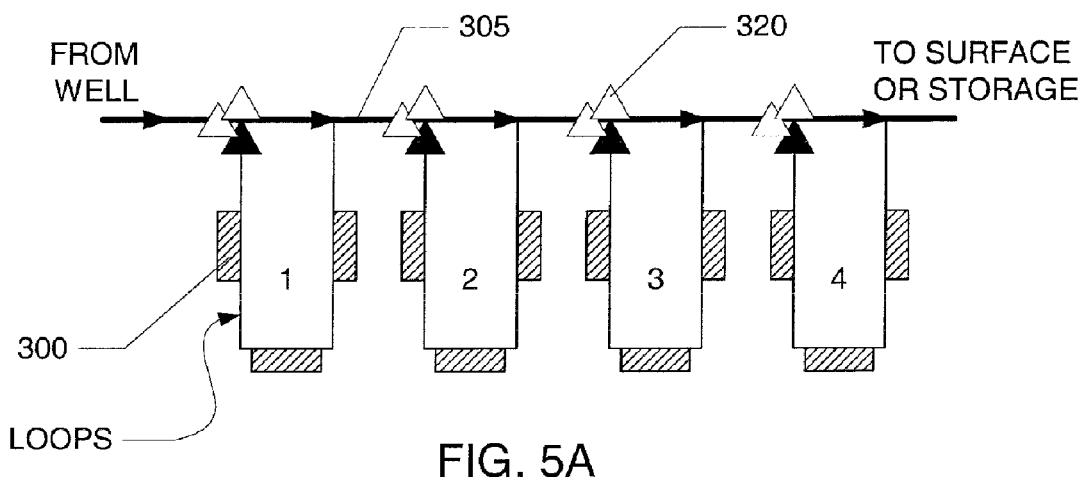
FIGS. 5A–5C illustrate schematic views depicting various embodiments of thermoelectric generator arrangements for use in capturing and supplying energy as components of a subsea power supply system.
Figure 5B:
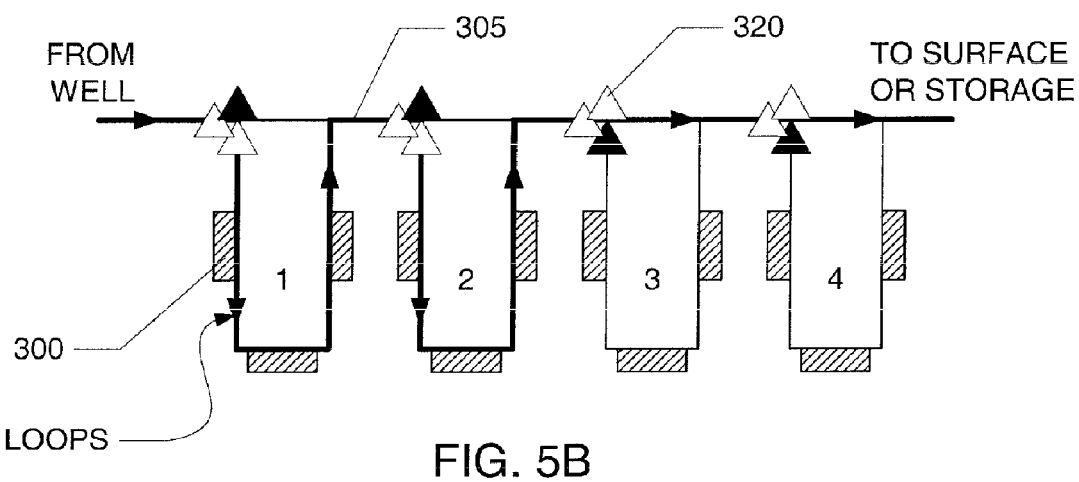
Figure 5C:
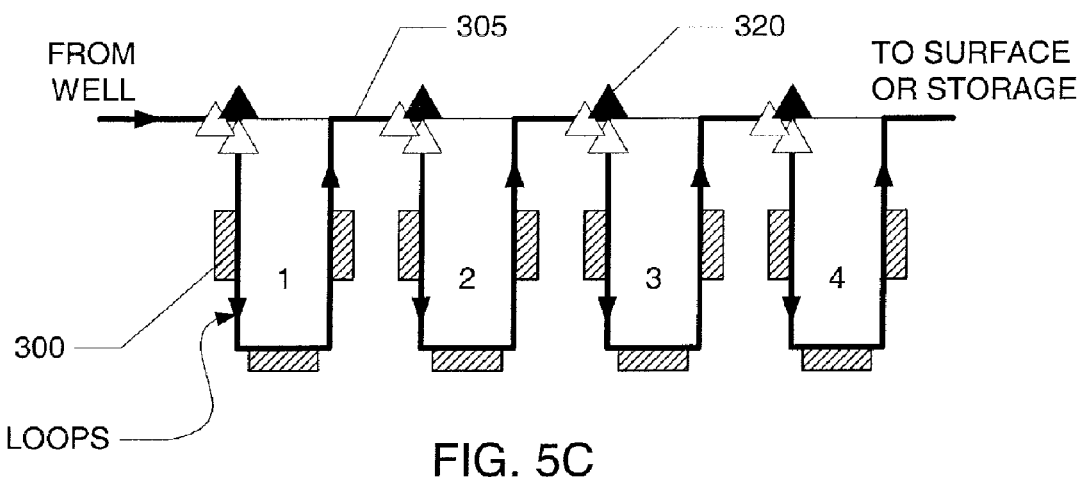

In another example, as shown in FIG. 4, the energy-capturing device 40 may be a thermoelectric generator 200 arranged in an annulus of a well 30 between a conduit 210 and the surrounding formation or casing. The thermoelectric generator 200 is electrically connected to the power supply 130. The power supply 130 may be the power converter 50 (FIG. 2) of the subsea power system, and the thermoelectric generator 200 may be electrically connected to the power converter 50 via input 50B. In operation, the thermoelectric generator 200 is arranged between a temperature differential to absorb the heat transfer and convert the heat energy into electrical energy. For instance, in operations requiring through-tubing water injection, a temperature differential will be created between the water (e.g., at 48° F.) injected through the conduit 210 and the formation (e.g., at 300° F.). The heat energy transferred across the temperature differential is absorbed by the thermoelectric generator 200, converted to electrical energy, and delivered to the power supply 130. In another instance, a thermoelectric generator may be arranged in the well to absorb and convert heat transfer caused by a vertical temperature gradient, since typically well and geothermal temperatures increase with depth. In yet another instance, with reference to FIGS. 5A–5C, a thermoelectric generator or plurality of thermoelectric generators 300 may be arranged outside the well adjacent to the production flow line 305 flowing from the well to the surface, storage, or other destination. Typically, the production fluid flowing through the flowline is imparted with geothermal energy from residing in the well and is thus warmer than the surrounding seawater. The thermoelectric generators 300 absorb the heat energy passed by the heat transfer between the production flow and the seawater and convert the heat energy to electrical energy. This electrical energy may be supplied to the power converter 50 via input 50A (FIG. 2). In some embodiments, the thermoelectric generators 300 may be arranged in one or more conduit loops 1, 2, 3, 4 branching from the main flowline 305, where each loop includes one or more thermoelectric generators 300. Flow via each loop 1, 2, 3, and 4 may be regulated by a set of valves 320 (e.g., three-way valves). By employing the valves 320 to regulate the flow through one or more loops 1, 2, 3, 4, the amount of heat energy imparted to the thermoelectric generators 300 may be adjusted. Manipulation of the valves 320 may be performed by a remote operated vehicle ("ROV") or an autonomous underwater vehicle ("AUV"), or by control line or wireless remote control from the surface. In FIG. 5A, the valves 320 for all loops 1, 2, 3, and 4 are closed off such that production fluid flow is not diverted through any of the loops. In FIG. 5B, the valves for loops 1 and 2 are open and the valves for loops 3 and 4 are closed off such that production fluid flow is diverted through only half of the thermoelectric generators. In FIG. 5C, the valves 320 for all loops 1, 2, 3, and 4 are open such that production fluid flow is diverted through all of the thermoelectric generators. As more production flow is directed through the loops of thermoelectric generators 300 via the valves 320, more heat energy is leached from the production flow to generate electrical energy. The control of how much heat energy is leached from the production flow is very significant as excessive cooling of the flow may yield paraffin deposition, hydrate formation, and asphaltine precipitation in the flowline 305, which could block or damage the flowline.

With regard again to FIG. 2, in some embodiments of the power supply system, the output 50D of the power converter 50 may be electrically connected to a damper (e.g., a capacitor or super-capacitor) for conditioning, smoothing, and/or storing the electrical power for use in powering an electrical device 20 (e.g., an electrically controlled valve, sensor, or pump). In other embodiments where the raw electrical signal is sufficient to power the electrical device 20, the damper 54 may not be present in the subsea power system.

Figure 6:
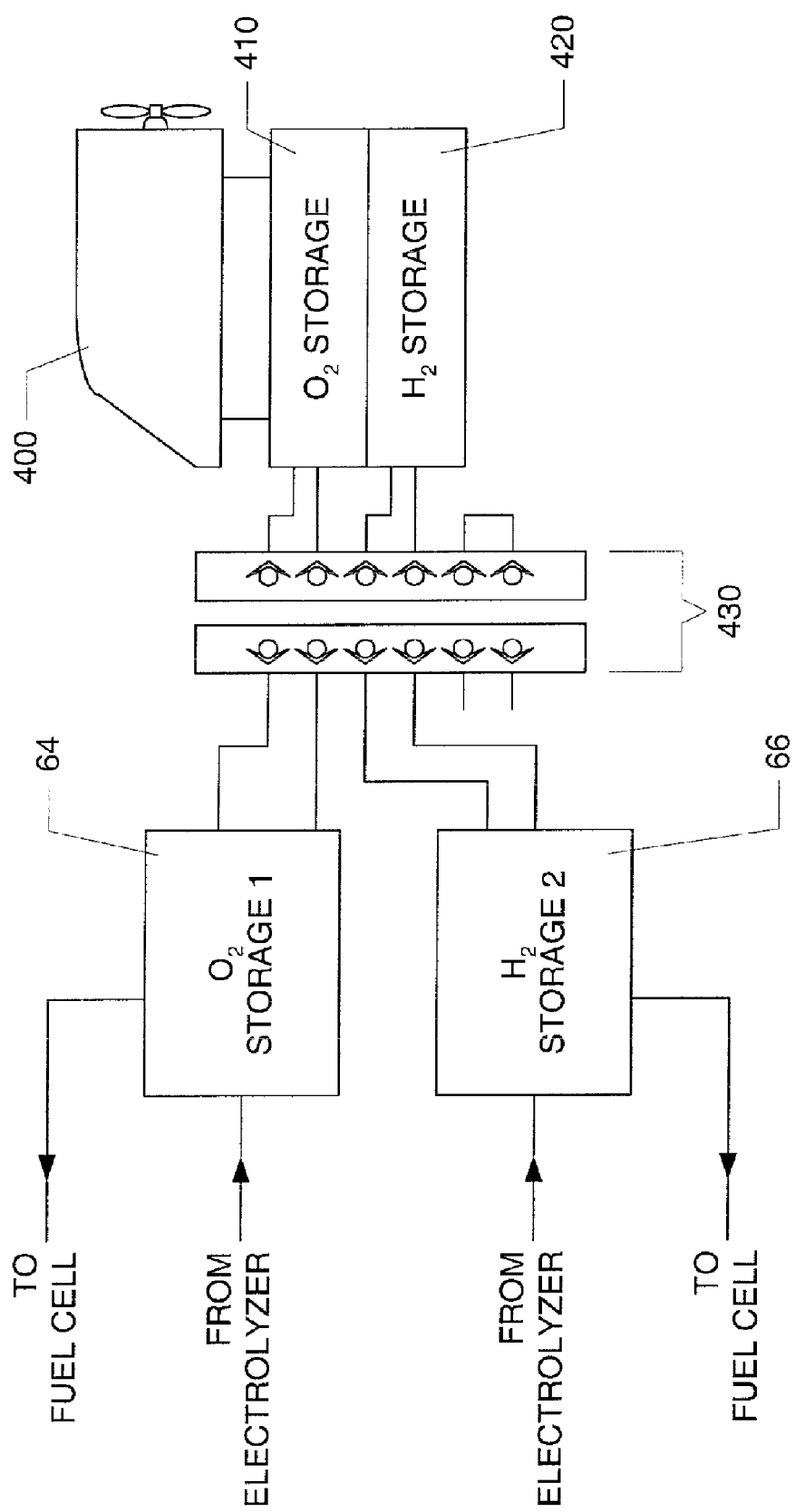
FIG. 6 illustrates a schematic view of an embodiment of an oxygen/hydrogen storage system accessible by an ROV and connected between a fuel cell and an electrolyzer for use with the subsea power supply system of the present invention.

Still with respect to FIG. 2, the input 50B of the power converter 50 is electrically connected to a fuel cell 60 for combining hydrogen and oxygen to create an electrochemical reaction thus releasing energy while generating water ($2H_2^+ + O_2^- = 2H_2O$). The fuel cell 60 may be connected to two supply or storage vessels: an oxygen storage vessel 64 and a hydrogen storage vessel 66. In some embodiments, an electrolyzer 62 is provided to receive seawater and breakdown the seawater into oxygen and hydrogen components. The oxygen component may be delivered and stored in the oxygen storage vessel 64 and the hydrogen component may be delivered and stored in the hydrogen storage vessel 66 for consumption by the fuel cell 60. Moreover, the electrolyzer 62 may be powered to breakdown the seawater by electrical connection to the power converter 50. In an alternative embodiment, as shown in FIG. 6, no electrolyzer is present in the system and hydrogen and oxygen are delivered to the respective storage vessels 64, 66 by ROV or AUV 400. In this embodiment, the oxygen and hydrogen storage vessels 64, 66 are accessible by an ROV or AUV 400 via a hydraulic interface 430. The ROV or AUV 400 includes an oxygen refueling tank 410 and a hydrogen refueling tank 420 for supplying the fuel cell 60 of the subsea power system.

Still further with respect to FIG. 2, the input 50E and output 50C of the power converter 50 may be electrically connected to an energy storage device 70 (e.g., a battery or a bank of batteries). The energy storage device 70 may receive surplus electrical energy from the power converter 50 for storage and usage during times where the demand is greater than otherwise supplied or where the demand is greater than steady-state. Also, the energy storage device 70 may supply the power converter 50 with electrical energy during shutdown of other energy supplying devices for maintenance or repair. Furthermore, the energy storage device 70 may provide the startup energy necessary to initiate other subsea power system components. For example, the energy storage device 70 may supply the startup power to activate the electrolyzer 62 such that hydrogen and oxygen may be stripped from the surrounding seawater and fed to the fuel cell 60 to provide energy to the power converter 50.

In operation, the subsea power system illustrated in FIG. 2 may function as a substantially self-sustaining power supply for subsea electrical devices 20 or as a power supply with multiple energy source redundancy. The subsea power system may be initially energized by the energy storage device 70 or by the free energy harvested and converted into electrical energy by the one or more energy-capturing devices 40. The electrical power is converted into useable form by the power converter 50, conditioned and smoothed by the damper 54, and delivered in sufficient quantities to power the electrical device 20. At steady state operations, a surplus of energy may be supplied to the power converter 50 (i.e., more than the electrical device 20 requires for operation). In this event, the surplus electrical energy may be used to charge or recharge the energy storage device 70. Alternatively, the surplus electrical energy may be used to power the electrolyzer 62 to breakdown seawater into oxygen and hydrogen components. The oxygen and hydrogen components may be stored in storage vessels 64 and 66, respectively. As needed, the fuel cell 60 may draw from the supplies of oxygen and hydrogen to combine and make water thereby creating an output energy that is captured and supplied to the power converter 50.

While the invention has been disclosed with respect to a limited number of embodiments, those skilled in the art will appreciate numerous modifications and variations therefrom. It is intended that the appended claims cover such modifications and variations as fall within the true spirit and scope of the invention. For example, while embodiments of the power supply system of the present invention are disclosed for subsea deployment, the power supply system may be used anywhere free or waste energy is available for capture.

What is claimed is:

1. A system for providing subsea power, comprising:
   an energy-capturing device for harvesting free energy;
   a power converter electrically connected to the energy-capturing device, the power converter adapted to convert the free energy into useable electrical energy;
   a fuel cell electrically connected to the power converter;
   an oxygen storage vessel connected to the fuel cell;
   a hydrogen storage vessel connected to the fuel cell;
   an interface connected to the oxygen storage vessel and the hydrogen storage vessel; and
   a subsea vehicle having separate oxygen and hydrogen storage tanks, the subsea vehicle adapted to be deployed subsea and engage the interface to deliver oxygen from the oxygen storage tank to the oxygen storage vessel and to hydrogen from the hydrogen storage tank to the hydrogen storage vessel.

2. The system of claim 1, wherein the energy-capturing device comprises:
   a conduit for holding production fluid flowing from a well;
   a turbine hydraulically connected to conduit; and
   a generator mechanically connected to the turbine and electrically connected to the power converter.

3. The system of claim 2, wherein the energy-capturing device further comprises:
   a choke hydraulically connected to the conduit and arranged in parallel with the turbine.

4. The system of claim 1, wherein the energy-capturing device comprises:
   a thermoelectric generator electrically connected to the power converter, the thermoelectric generator adapted to generate electrical energy from heat transfer across a temperature differential.

5. The system of claim 4, wherein the thermoelectric generator is arranged in a wellbore adjacent to a conduit for injecting a fluid into the wellbore, and wherein the temperature differential is between the wellbore and the fluid within the conduit.

6. The system of claim 4, wherein the thermoelectric generator is arranged in a wellbore and wherein the temperature differential comprises a vertical temperature gradient of fluid in the wellbore.

7. The system of claim 4, wherein the thermoelectric generator is arranged in seawater outside a wellbore adjacent to a conduit carrying production fluid from the wellbore, and wherein the temperature differential is between the seawater and the production fluid.

8. The system of claim 7, further comprising:
   a plurality of conduit loops branching from and reconnecting to the conduit;
   at least one thermoelectric generator arranged adjacent to each conduit loop; and
   a valve arranged between each conduit loop and the conduit.

9. The system of claim 1, further comprising:

an energy storage device electrically connected to the power converter, the energy storage device adapted to receive electrical energy from the power converter to be delivered back to the power converter as needed.

10. The system of claim 1, further comprising:

an electrical device for performing a subsea operation, the electrical device being electrically connected to the power converter; and a damper electrically connected between the power converter and the electrical device, the damper adapted to condition the electrical energy from the power converter for use by the electrical device.

11. The system of claim 1, further comprising an electrolyzer connected to the oxygen storage vessel and the hydrogen storage vessel, the electrolyzer adapted to receive seawater, break down the seawater into oxygen and hydrogen, and deliver the oxygen and hydrogen to the oxygen storage vessel and the hydrogen storage vessel respectively.

12. The system of claim 11, wherein the electrolyzer is electrically connected to the power converter.

* * * * *